June 24, 1930.   E. WILDHABER   1,767,867
GEAR
Filed March 10, 1928   2 Sheets-Sheet 1

INVENTOR
Ernest Wildhaber

June 24, 1930.  E. WILDHABER  1,767,867

GEAR

Filed March 10, 1928  2 Sheets-Sheet 2

INVENTOR

Ernest Wildhaber

Patented June 24, 1930

1,767,867

UNITED STATES PATENT OFFICE

ERNEST WILDHABER, OF BROOKLYN, NEW YORK

GEAR

Application filed March 10, 1928. Serial No. 260,798.

The present invention relates to the tooth shape of gears having teeth inclined to the straight generatrices of their pitch surfaces, and more specifically to gears having helical teeth, such as helical gears and herringbone gears.

One object of the present invention is to provide a novel tooth form for helical and herringbone gears, which has a large load carrying capacity and which favors efficient lubrication.

Another object is to provide a novel tooth form, which is advantageous on gears having teeth inclined to the straight generatrices of their pitch surfaces, and which can be efficiently and accurately produced.

A further aim is to devise wholly convex and wholly concave mating tooth profiles, which approximate in some respects the advantages obtained with the profiles of the character described in my Patent No. 1,601,750, issued October 5, 1926, and which can be applied also to gears of narrower face.

Other objects will appear in the course of the specification and from recital of the appended claims.

The invention is illustrated by way of examples in the accompanying drawings, in which:

Fig. 4 can also be considered as a normal section of a basic rack.

Figure 1:
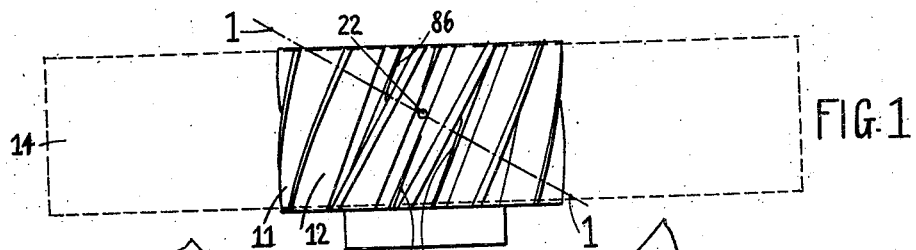
Fig. 1 is a plan view of a helical pinion constructed in accordance with the present invention, the outline of a mating gear being indicated in dotted lines.
Figure 2:
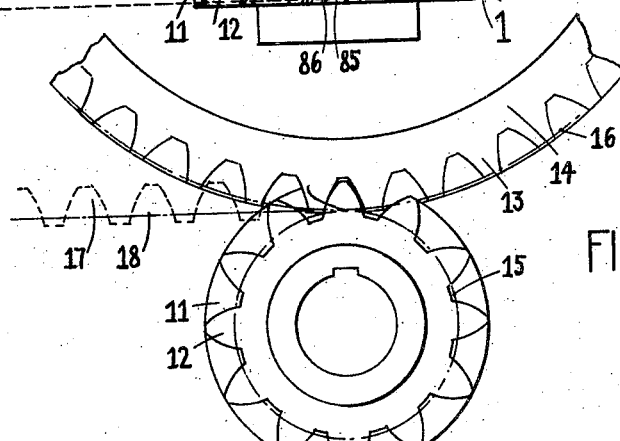
Fig. 2 is a front elevational view corresponding to Fig. 1, with one gear shown in part only.

In the Figures 1 and 2, the numeral 11 denotes a pinion containing helical teeth 12, which mesh with teeth 13 of a gear 14. In the instance illustrated the gears 11 and 14 have parallel axes and mesh in a manner that their pitch surfaces 15, 16 roll upon each other without sliding.

The tooth shape of the gears 11 and 14 will now be explained with reference to Fig. 3 and Fig. 4. It can be most readily defined through its relation with a basic rack, that is to say a rack 17 (see Fig. 4) suited to mesh with a gear (14) while its pitch plane 18 rolls on the cylindrical pitch surface (16) of said gear. In a preferred embodiment of the present invention the basic rack 17 contains circular tooth profiles 19 in a normal section, that is to say in a plane section laid at right angles to the direction of its teeth. The centers 20 of said profiles are disposed outside of the pitch plane 18, on a line 21.

Numeral 22 denotes the pitch point of the shown normal section, see also Fig. 1. The line of action between rack 17 and gear 14 is known to be the same as between the gears 11 and 14 and can be determined in known manner by drawing the tooth normals (24) in any point (26) of a rack profile 19, and by determining the intersection point (28) between said normal and the pitch line 18 of the normal section. Points (30) of the line of action are then obtained by displacing a point (26) of the rack profile in the direction of the pitch line 18 a distance equal to the distance between the above said intersection point (28) and the pitch point 22. Any point (26) of the rack profile makes namely contact in a position (30) in which the profile perpendicular (24) passes through the pitch point 22.

In this known manner a line 32 is determined as the line of action of the considered normal section. The end points 27, 30 of the line of action between the gears 11 and 14 are obtained by drawing the outside lines 33, 34 of said gears, indicated in dotted lines, and by locating their intersection points with the line of action. The said end points 27, 30 of the lnie of action correspond to points 27, 26 of the rack profile 19. The portion 26—27 of the rack profile is suited to make contact with both gears 11 and 14 and is frequently called the active profile.

When the profile 19 is a circular arc centered outside of the pitch plane 18, in accordance with a preferred embodiment of the present invention, then the corresponding gear profiles 35, 36 (Fig. 3) are lines other than circular arcs, that is to say lines of changing curvature. Usually the gear or larger member of a pair of gears is provided with active tooth profiles 27—26'' which are wholly concave, and the pinion or smaller member of said pair is provided with active tooth profiles 27—26' which are wholly convex, both profiles having a changing curvature, so that the curvature radii in different points of a profile have a different length.

Figures 3, 4:
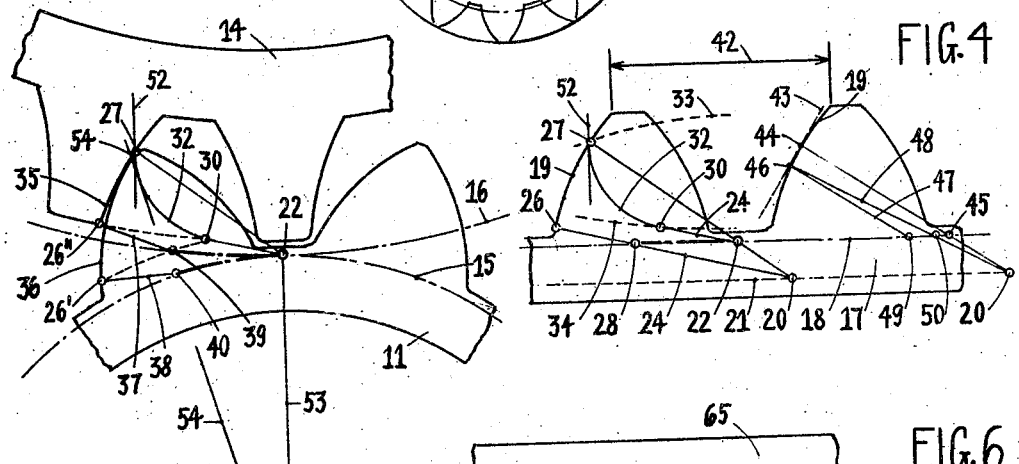
Fig. 3 is an enlarged and partial view of intermeshing gear teeth, in a normal section along lines 1—1 of Fig. 1.
Fig. 4 is an enlarged and partial view of a basic rack corresponding to the gear profiles shown in Fig. 3.

The line of action 32 of Fig. 3 has the shape already determined in Fig. 4. As is well known, the perpendiculars in corresponding points of conjugate tooth profiles intersect the respective pitch circles at equal distance from the pitch point. For instance the perpendiculars 37, 38 of the corresponding points 26'', 26' of the profiles 35, 36 intersect the respective pitch circles 16, 15 in points 39, 40 which have an equal distance from the pitch point 22. Hereby the said distances are understood to be measured on the circular arcs of the respective pitch circles. Moreover the perpendicular 24 of the corresponding point 26 of the rack profile 19 intersects the pitch line 18 in a point 28, which has also the same distance from pitch point 22. Further it is known that the perpendiculars in any two points (27, 26'') of the gear profile 35 intersect the pitch circle (16) inside of a distance 39—22 which equals the corresponding distance 40—22 on pinion 11 and the corresponding distance 28—22 of the rack 17.

Such characteristics, as distances at which tooth perpendiculars intersect the pitch lines, can therefore be conveniently analyzed with reference to a basic rack, and can then be directly applied to gears without change. The same holds true for the shape and position of the line of action, as is well known. For such reasons the description will be confined to basic racks in the following, and it is understood that racks are described particularly for defining gears and gear pairs.

Referring to Fig. 4, the perpendiculars of the active portion 26—27 of profile 19 intersect the pitch line 18 inside of a distance 28—22 which is smaller than the pitch 42 of the considered normal section. Frequently the said distance (28—22) is made smaller even than one half of the pitch, as indicated in Fig. 4.

As a result tooth contact may be made to travel comparatively fast over the considered tooth profile of a normal section. For comparison a straight rack profile 43 will be considered, which corresponds to gear teeth of involute form, as known. Rack profile 43 is indicated in dotted lines and contacts with profile 19 at a point 44. The common or joint profile perpendicular intersects pitch line 18 in a point 45. Other points 46 are assumed on the two rack profiles 43 and 19, equally distant from point 44. Their perpendiculars 47, 48 intersect the pitch line 18 in two points 49, 50 which are separated from point 45 by distances 49—45, 50—45 of which the first one is more than double the second one. Inasmuch as tooth contact is made when the corresponding points 45, 50, 49 coincide with the pitch point 22, it is seen that tooth contact travels or passes over a tooth profile 19, from 46 to 44, more than twice as fast as over a straight profile 43. This feature has been found to effectively increase the intimacy of tooth contact of gears derived from a basic rack 17, and is for this reason very desirable on gears provided with helical teeth and broadly on gears containing teeth inclined to the straight generatrics of the respective pitch surfaces. Helical gears do not depend solely on the tooth profile for effecting continuous uniform motion, but may derive uniform motion also from the tooth helices. They are therefore suited to make full use of an advantage, namely intimacy of tooth contact, which is denied to spur gears having teeth extending in the direction of the gear axis. The latter gears, as well known, should be provided with tooth profiles of such shape that their action lasts longer than one pitch, that is to say that the point of contact travels at a moderate rate over a tooth profile, so that said travel lasts long enough to continue until a subsequent tooth enters engagement. Spur gears having straight teeth parallel to the gear axis for this reason contain active tooth profiles whose perpendiculars intersect the pitch surface in a distance which is at least as long as one pitch to secure uniform motion, and which is preferably made longer.

The gears constructed in accordance with the present invention differ from the gears claimed in my Patent No. 1,601,750 by providing a gradual tooth engagement between the profiles of a normal section. The latter gears, if fully conjugate, provide simultaneous engagement of mating tooth profiles, that is to say the contact does not start on one end of the tooth profiles, but the whole active length of said profiles comes into contact at once. In this case there is no line of action. There is no point contact between said tooth profiles, which point contact moves in relation with the turning angles of the gears.

Gears constructed in accordance with the present invention contain a line of action and its characteristic shape will be further described hereafter.

A further difference resides in the feature that according to the present invention the tooth profiles have a changing curvature, whereas the theoretical tooth profiles according to the former invention referred to are circular arcs, or approximately circular arcs.

In both inventions the gear or larger member of a pair of gears is preferably provided with a wholly concave active tooth profile, and in either case the gears can be produced with simple tools and with efficient methods of production.

The gears constructed according to the present invention differ from other gears having helical teeth of known enveloping type through their short duration of contact of tooth profiles of a normal section, through the shape of the line of contact and the shape of the line of action, through the simple shape of the basic racks and by permitting simple, accurate and efficient means of production, as will be more fully described. The above said points of difference may occur either in combination or individually.

The rack profiles 19 preferably have such a radius and are so positioned relatively to pitch line 18, that the line of action 32 is tangent to a straight line 52 which is perpendicular to pitch line 18. In Fig. 3 the line of action 32 is tangent to a line 52 which is parallel to a radius 53 of the pitch circle 15 (or 16), said radius passing through the pitch point 22. Moreover it is also seen that line of action 32 is also tangent to a radius 54 of the pitch circle 15 of the shown normal section. The said tangents are a measure of the inclination of the line of action and indirectly of the intimacy of tooth contact.

Figures 5, 6:
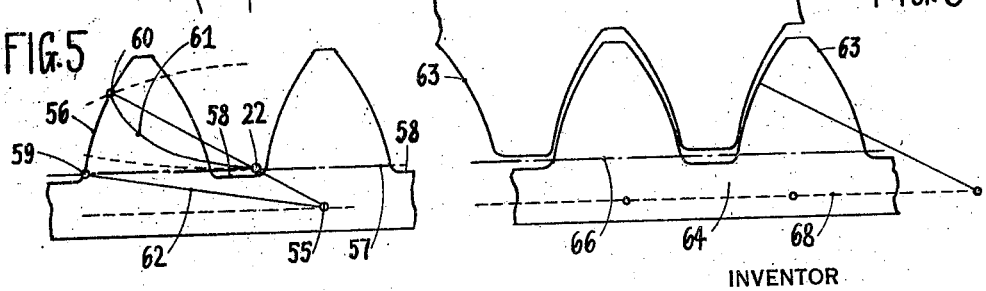
Fig. 5 is a partial view of another basic rack, illustrative of a modified line of action.
Fig. 6 is a partial view of a pair of complementary racks which are basic to two gears of a pair of gears respectively.

In Fig. 5 I have indicated a somewhat modified form of tooth, derived also from a basic rack having circular tooth profiles. The center 55 of the circular rack profile 56 is located again outside of the pitch line 57 and nearer to the tooth bottoms 58 than in the former example. The active rack profile is included between the points 59, 60 and corresponds to a line of action 61 which starts at the pitch point 22. In contradistinction with known forms of enveloping teeth derived from non-circular rack profiles, the line of action 61 passes through pitch point 22 in a direction inclined to the pitch line 57, namely in a direction parallel to tooth normal 62 of point 59, as will be understood by those familiar with gearing. Point 59 is situated on the pitch line 57, as shown. In the said known enveloping forms of teeth the line of action is tangent to the pitch line 57 at the pitch point 22.

Fig. 6 illustrates a pair of complementary racks having circular tooth profiles 63. One gear of a pair of gears may be derived from a basic rack 64, and the other gear of said pair from a basic rack 65. Generation of a gear may be effected by providing a tool embodying one of said racks and by effecting such motion between said tool and a gear blank, as exists when the pitch plane 66 of the rack rolls without sliding on the cylindrical pitch surface of the gear blank. The theoretical profiles of the two racks are entirely complementary and their pitch planes (66) coincide when the profiles of said racks are in mutual contact. On account of the equal form of the profile lines of the two complementary racks, reference to a complementary rack has been omitted in the Figures 4 and 5, for convenience. Moreover no shading has been applied to the normal sections for the same reason, namely for clarifying the explanatory lines.

One way of cutting gears conjugate to basic racks of circular profile (63) is by providing hobs having multiple threads and by operating said hobs in accordance with the general disclosure of my Patent No. 1,653,686 issued December 27, 1927.

The thread surfaces of a hob may be determined in known manner as if they were tooth surfaces of a helical pinion. A hob, whose thread is conjugate to a rack 64 or a rack 65 and suited to be enveloped by the tooth sides of said rack, contains a thread profile different from a circular arc, especially when said hob is provided with multiple threads. Naturally a circular arc is a simpler line than any other curve, and capable of very accurate reproduction, on account of its simplicity. It will now be shown how a hob may be devised, whose thread is conjugate to a rack of the character shown in Fig. 6, and which nevertheless contains theoretically accurate circular profiles.

A truly circular thread profile may be obtained, when the hob meshes with a rack in the manner corresponding to a pitch plane 68 instead of the pitch plane 66.

Plane 68 namely contains the centers of the circular tooth profiles 63 of a normal section of the rack teeth, and for this reason the rack may reproduce its own circular profile on any hob, worm, pinion, or gear which meshes with said rack in a manner, that the plane 68 of the rack can be considered as rolling without sliding on the contacting cylindrical surface of said hob, worm, pinion, or gear. This feature has been fully explained in my Patent No. 1,653,686 above referred to.

The rack embodied by a hob meshes then in a different manner with said hob and with a gear blank. It meshes with a gear blank in the manner corresponding to a pitch plane 66 of the rack, while it meshes with the threads of the hob in the manner corresponding to a different pitch plane 68. No error is introduced thereby, as will be understood by those skilled in the art. On the other hand an efficient hob is obtained, which contains a very simple thread profile, namely a circular arc, and which permits accurate production of gears of my invention.

Figure 7:
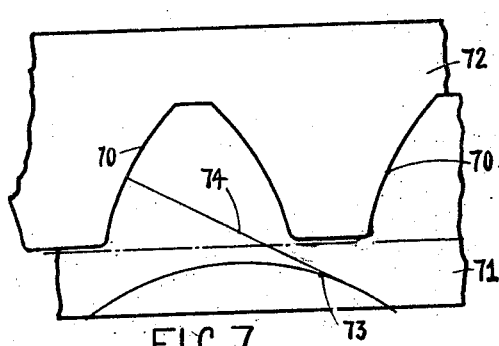
Fig. 7 and Fig. 8 are partial views of other basic racks of a character in accordance with the present invention.
Figure 8:
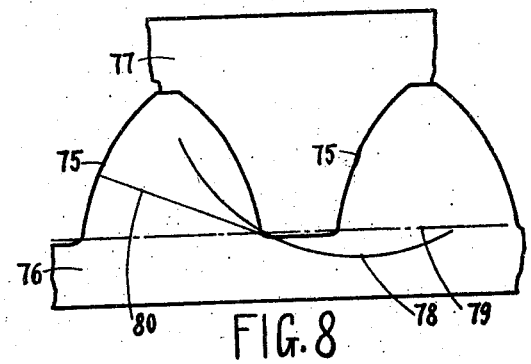

The Figures 7 and 8 illustrate complementary racks having other than circular profiles. The profile 70 of the racks 71, 72 is an involute of a circle, having a base circle 73. 74 denotes a perpendicular to the profile 70, and is seen to be tangent to base circle 73. An involute of a circle is known to be next to a circle in simplicity.

The profile 75, Fig. 8, of the racks 76, 77 is also an involute, having however its base circle 78 differently positioned with respect to pitch line 79. It is seen to be a circular arc crossing pitch line 79. A perpendicular to profile 75 is shown at 80.

Thus far specific embodiments of my invention have been disclosed. A more general embodiment will now be described with reference to the Figures 9, 10 and 11.

This general embodiment and former specific embodiments will now be broadly characterized through the aspect of a line of simultaneous contact between a pair of gears, and further through their lines of action. The said line of contact, the line of action, and the tooth shape of gears are interrelated in known manner and may be determined one from another with the known methods of the gear art.

Figure 9:
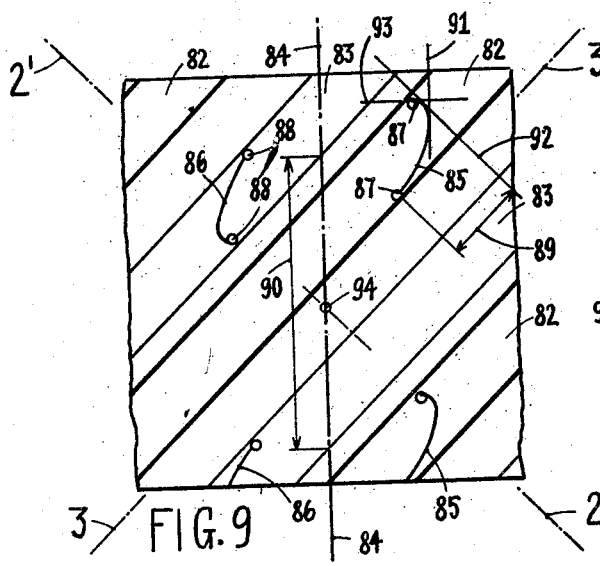
Fig. 9 is a plan view of a rack, showing somewhat diagrammatically the lines of contact between a pair of gears formed in accordance with the present invention, or also the lines of contact between a gear and said rack.

In Fig. 9, 82 are the tooth sides of a basic rack facing corner 2, and 83 are the tooth sides of said rack facing corner 2'. The corresponding tooth profiles of the basic racks are equally denoted with 82, 83 in Fig. 10. The plane containing the two axes of a pair of gears is indicated as a dash and dot line 84 in Fig. 9. The lines 85, 86 of simultaneous contact between a pair of gears are also situated on the tooth surface of a basic rack and extend between end points 87, 88.

It is noted that the lines of contact 85, 86 extend lengthwise of the teeth a distance 89 smaller than the axial pitch 90. This feature holds true for all preferred embodiments of the present invention. Moreover a line of contact 85 is tangent to a plane 91 which is parallel to the plane 84 containing the two axes of the pair of gears. Both planes, namely plane 84 and plane 91 are perpendicular to the plane of the drawing Fig. 9, which is parallel to the pitch plane (79), and are seen as straight lines in the plan view Fig. 9. In many cases a line of contact 85 is moreover tangent to a normal profile of the tooth surface, that is to say tangent to the profile of a section 92 which is perpendicular to the direction of the rack teeth. In some cases a line of contact is moreover tangent to a plane 93, which is perpendicular to the axes of the gears.

Figure 10:
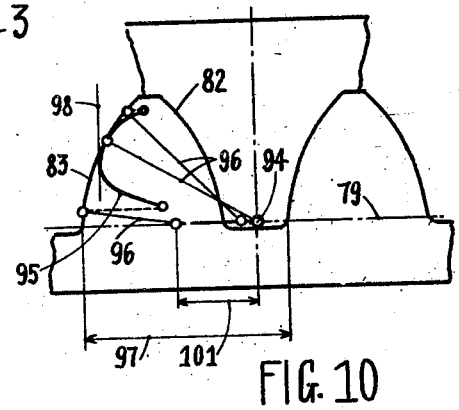
Fig. 10 is a normal section through a pair of complementary basic racks, taken along lines 2—2' of Fig. 9.

The numeral 94 denotes the pitch point, and 95 the line of action of the normal section Fig. 10. As has been already described, the tooth perpendiculars 96 intersect the pitch line 79 inside of a distance 101 which is smaller than the pitch 97, and which is preferably kept inside of one half of said pitch. The line of action 95 is tangent to pitch a line 98, which is perpendicular to pitch line 79, and in many cases the line of action is also tangent to a circle drawn with pitch point 94 as the center. In Fig. 10 the said circle practically coincides with a portion of the tooth profile 83.

Figure 11:
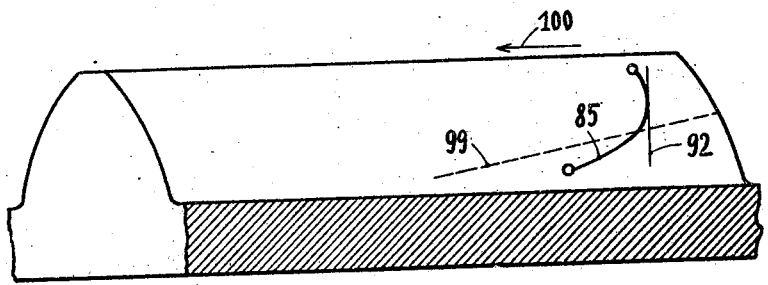
Fig. 11 is a front view of a rack tooth and a section along lines 3—3 of Fig. 9.

In Fig. 11 a line 85 of simultaneous tooth contact is seen in a view taken at right angles to the tooth surface. It is a concave curve having an inclination much steeper than the straight line of contact 99 of known involute gears, shown in dotted lines for comparison. In the view Fig. 11 the normal profile previously referred to appears as a straight line 92.

When a pair of gears mesh together, and especially when motion is applied from a pinion having convex tooth profiles to a gear having concave tooth profiles, the lines of contact 85, 86 move in a direction lengthwise of the teeth, in the direction of arrow 100, Fig. 11. They maintain thereby a constant shape and a constant distance from plane 84, Fig. 9.

By moving with their concave sides facing forward, in direction of arrow 100, the lines of contact 85, 86 act somewhat in the manner of buckets on the lubricant, which adheres to the tooth surfaces. The position and concave curvature of the lines of contact 85, 86 tend to hold the lubricant in the zone of contact, and to provide a very efficient lubrication of the tooth surfaces. In contradistinction thereto the straight lines of contact 99 of involute gears tend rather to shave off the lubricant and do not compel it to remain in the zone of contact.

It is understood that further modifications may be made in my invention without departing from its spirit. For definition of its scope it is relied upon the annexed claims.

What I claim is:

1. A gear containing helical teeth suited to contact with its basic rack along lines curved in a projection to the pitch plane of said rack, the active profile of a normal section of said teeth being wholly concave and having a changing curvature, the perpendiculars of said profile intersecting the pitch surface inside of a distance smaller than one half of the pitch of said normal section.

2. A gear containing teeth inclined to the straight generatrices of its pitch surface and suited to contact with its basic rack along lines curved in a projection to the pitch plane of said rack, the active profile of a normal section of said teeth being wholly concave and having a changing curvature, the perpendiculars of said profile intersecting the pitch surface inside of a distance smaller than one half of the pitch of said normal section.

3. A gear containing helical teeth suited to contact with its basic rack along lines curved in a projection to the pitch plane of said rack, the profile of a normal section of said teeth having a curved line of action, and the perpendiculars of the active part of said profile intersecting the pitch surface inside of a distance smaller than one half of the pitch of said normal section.

4. A gear containing teeth inclined to the straight generatrices of its pitch surface, a normal section of said teeth having a line of action corresponding to a distance smaller than one pitch, said line of action being tangent to a radius of the pitch circle of said normal section.

5. A gear containing helical teeth, a normal section of said teeth having a line of action corresponding to a distance smaller than one pitch, said line of action being tangent to a radius of the pitch circle of said normal section.

6. A gear containing teeth inclined to the straight generatrices of its pitch surface, a normal section of said teeth having a line of action corresponding to a distance smaller than one pitch, said line of action being tangent to a line parallel to a radius of the pitch circle of said normal section, said radius passing through the pitch point of said circle.

7. A gear containing teeth inclined to the straight generatrices of its pitch surface, a normal section of said teeth having a line of action corresponding to a distance smaller than one pitch, said line of action being tangent to a circle centered in the pitch point of said normal section.

8. A gear containing helical teeth of changing profile curvature and suited to contact with its basic rack along lines curved in a projection to the pitch plane of said rack, said rack having a wholly convex active tooth profile in a normal section, the perpendicular to said profile intersecting the pitch line of the rack inside of a distance smaller than the pitch of said normal section.

9. A gear containing helical teeth suited to mesh with a basic rack having substantially circular tooth profiles, a normal section of said teeth having a line of action corresponding to a distance smaller than one pitch, said line of action being tangent to a line parallel to the radius of the pitch circle, which passes through the pitch point of said circle.

10. A gear containing helical teeth of changing profile curvature suited to mesh with a basic rack having substantially circular active tooth profiles, the centers of said profiles being disposed outside of the pitch line of said rack, and the perpendiculars to said tooth profiles intersecting the pitch line of the rack inside of a distance smaller than one half of the pitch.

11. A gear containing helical teeth of changing profile curvature suited to mesh with a basic rack having active tooth profiles of the form of single circular arcs in a normal section, the centers of said profiles being disposed outside of the pitch line of said rack, and the perpendiculars to said tooth profiles intersecting the pitch line of the rack inside of a distance smaller than one half of the pitch of said normal section.

12. A gear containing teeth inclined to the direction of its axis and suited to contact with its basic rack along lines curved in a projection to the pitch plane of said rack, said rack having active tooth profiles of the form of single circular arcs, said gear having active tooth profiles which are wholly concave and of changing curvature, the perpendiculars of the last said profiles intersecting the pitch surface inside of distances smaller than one half of the pitch.

13. A gear containing helical teeth suited to contact with a rack along lines curved in a projection to the pitch plane of said rack, said rack having active tooth profiles of the form of single circular arcs, the active profile of a normal section of a gear tooth being wholly concave and having a changing curvature, the perpendiculars of the last said profile intersecting the pitch surface inside of a distance smaller than one half of the pitch in said normal section.

14. A pair of gears containing teeth inclined to the straight generatrices of their respective pitch surfaces, said gears having tooth surfaces so shaped and so positioned relatively to their pitch surfaces, that tooth contact between said gears is effected in a curved line, said curved line being tangent 15. A pair of gears containing teeth inclined to the straight generatrices of their respective pitch surfaces, said gears having tooth surfaces so shaped and so positioned relatively to their pitch surfaces, that tooth contact between said gears is effected in a line tangent to the profile of a normal section of said teeth, said line receding from said profile on either side of the point of tangency.

16. A pair of gears containing helical teeth, having tooth surfaces so shaped and so positioned relatively to their pitch surfaces, that tooth contact between said gears is effected in a line tangent to the profile of a normal section of said teeth, said line receding from said profile on either side of said point of tangency and occupying a distance smaller than the axial pitch of said teeth in lengthwise direction of the teeth.

17. A pair of gears containing helical teeth, having tooth surfaces so shaped and so positioned relatively to their pitch surfaces that tooth contact between said gears is effected in a line tangent to the profile of a normal section of said teeth, said line being wholly concave in a view at right angles to a tooth surface and occupying a distance smaller than the axial pitch of the teeth in lengthwise direction of the teeth.

18. A pair of gears containing teeth inclined to the straight generatrices of the respective pitch surfaces and suited to contact with each other along lines curved in a projection to the joint tangential plane of their pitch surfaces, the tooth profiles of one gear of said pair being wholly concave and having a changing curvature, said gears having tooth surfaces so shaped and so positioned relatively to their pitch surfaces that contact between said gears is effected in a line extending lengthwise of the teeth a distance smaller than one half of the axial pitch of the teeth.

19. A pair of gears containing helical teeth, having tooth surfaces so shaped and so positioned relatively to their pitch surfaces that tooth contact between said gears is effected in a line extending lengthwise of the teeth a distance smaller than the axial pitch of the teeth, said line being tangent to a plane parallel to the plane containing the axes of said gears and being wholly concave in a view perpendicular to a tooth surface.

20. A pair of gears containing teeth inclined to the straight generatrices of the respective pitch surfaces, said gears having tooth surfaces so shaped and so positioned relatively to their pitch surfaces that contact between said gears is effected in a line extending lengthwise of the teeth a distance smaller than the mean axial pitch of the teeth, said line being tangent to a plane parallel to the plane containing the axes of said gears and being wholly concave in a view perpendicular to a tooth surface.

ERNEST WILDHABER.